(12) United States Patent
Dawsey et al.

(10) Patent No.: US 7,633,194 B2
(45) Date of Patent: Dec. 15, 2009

(54) APPARATUS FOR COOLING STATOR LAMINATION STACKS OF ELECTRICAL MACHINES

(75) Inventors: Robert T Dawsey, Torrance, CA (US); Constantin C. Stancu, Anaheim, CA (US); Eric R. Ostrom, Bellflower, CA (US); Young Doo, La Palma, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/553,028

(22) Filed: Oct. 26, 2006

(65) Prior Publication Data
US 2008/0100159 A1 May 1, 2008

(51) Int. Cl.
*H02K 9/08* (2006.01)
(52) U.S. Cl. .............................. 310/57; 310/64; 310/65; 310/216
(58) Field of Classification Search .................... 310/57, 310/64, 65, 216, 54, 59
See application file for complete search history.

(56) References Cited

U.S. PATENT DOCUMENTS

| | | | | |
|---|---|---|---|---|
| 611,784 | A * | 10/1898 | Hill | 118/209 |
| 1,882,487 | A * | 10/1932 | Dupont | 310/65 |
| 2,818,515 | A * | 12/1957 | Dolenc | 310/57 |
| 3,675,056 | A * | 7/1972 | Lenz | 310/54 |
| 4,739,204 | A * | 4/1988 | Kitamura et al. | 310/68 D |
| 4,818,906 | A * | 4/1989 | Kitamura et al. | 310/58 |
| 4,922,148 | A * | 5/1990 | Kitamura | 310/68 D |
| 4,963,776 | A * | 10/1990 | Kitamura | 310/64 |
| 4,980,588 | A * | 12/1990 | Ogawa | 310/68 D |
| 5,173,629 | A * | 12/1992 | Peters | 310/216 |
| 5,331,238 | A * | 7/1994 | Johnsen | 310/58 |
| 5,491,371 | A * | 2/1996 | Ooi | 310/58 |
| 5,836,270 | A * | 11/1998 | Aoki et al. | 123/41.31 |
| 5,977,679 | A * | 11/1999 | Miller et al. | 310/164 |
| 5,982,071 | A * | 11/1999 | Ehrick | 310/216 |
| 6,160,332 | A * | 12/2000 | Tsuruhara | 310/54 |
| 6,300,693 | B1 * | 10/2001 | Poag et al. | 310/54 |
| 6,617,715 | B1 * | 9/2003 | Harris et al. | 310/54 |
| 6,617,716 | B2 * | 9/2003 | Ishida | 310/58 |
| 6,700,236 | B2 * | 3/2004 | Umeda et al. | 310/54 |
| 6,870,292 | B2 * | 3/2005 | Owada et al. | 310/194 |
| 6,924,574 | B2 * | 8/2005 | Qu et al. | 310/114 |
| 6,982,506 | B1 * | 1/2006 | Johnsen | 310/61 |
| 7,009,317 | B2 * | 3/2006 | Cronin et al. | 310/54 |
| 2005/0057106 | A1 * | 3/2005 | Allen et al. | 310/54 |

* cited by examiner

*Primary Examiner*—Quyen Leung
*Assistant Examiner*—Naishadh N Desai

(57) ABSTRACT

A coaxial stack of laminations for a stator of an electrical machine uses laminations that are substantially identical and in direct abutment with one another. Each of the laminations has an outer periphery and an inner periphery with the outer periphery being defined by an array of outwardly projecting pins and the inner periphery being defined by an array of inwardly projecting teeth. The outwardly projecting pins cooperate with a jacket surrounding the stack to provide a cooling space through which cooling liquid flows while the teeth provide spaces therebetween for receiving for receiving stator windings. The number of pins ($n_{pin}$) is proportional to the number of teeth ($n_{th}$) according to the relationship $(2K+1)/(2K_{th})$ times the number of teeth ($n_{th}$), where K is a selected integer number and $K_{th}$ is the number of teeth past which each lamination is rotated with respect to adjacent laminations so that spaces between the teeth of adjacent laminations are aligned.

16 Claims, 7 Drawing Sheets

APPARATUS FOR COOLING STATOR LAMINATION STACKS OF ELECTRICAL MACHINES

FIELD OF THE INVENTION

The present invention relates to apparatus for cooling stator lamination stacks of electrical machines, wherein laminations in the stack include radially projecting pins having spaces therebetween through which cooling fluid flows. More particularly, the present invention relates to such machines configures as electric motors for powering automotive vehicles.

BACKGROUND OF THE INVENTION

Cooling electric motors used to power automotive vehicles helps improve the efficiency of the motors. A way to configure such a cooling arrangement is to utilize an array of pins projecting outwardly from the stators of such motors to form an outer periphery of the stator configured as a Pin Fin array which cooperates with a jacket surrounding and pressed in heat transfer relationship with free ends of the pins. The free ends of the pins and the pin jacket have contact surfaces at which there is a substantial temperature drop due to cooling fluid flowing around the pins and over the inner surface of the jacket.

In automotive vehicle manufacture, it is desirable to reduce costs while retaining reliability. In current practice, laminations of different configurations are utilized in order to provide spacing at the periphery of the stator to allow flow of the coolant fluid over the stator. Utilizing more than one configuration for laminations increases stator manufacturing cost and stator assembly cost.

SUMMARY OF THE INVENTION

A coaxial stack of laminations for a stator of an electrical machine uses laminations that are substantially identical and in direct abutment with one another. Each of the laminations has an outer periphery and an inner periphery with the outer periphery being defined by an array of outwardly projecting pins and the inner periphery being defined by an array of inwardly projecting teeth. The outwardly projecting pins cooperate with a jacket surrounding the stack to provide a cooling space through which cooling liquid flows while the teeth provide spaces therebetween for receiving stator windings.

In an aspect of the invention, each of the pins taper outwardly from a base to a terminus which has a width less than the width of the base to provide angular gaps between the pins of adjacent laminations, through which gaps the cooling liquid flows.

In a further aspect of the invention, each pin is spaced from adjacent pins on the lamination by a distance equal to the width of the base of the pin, wherein pins of adjacent laminations are aligned with the gaps while the spaces between the teeth are aligned to receive stator windings.

In still a further aspect of the invention, the number of pins ($n_{pin}$) is proportional to the number of teeth ($n_{th}$) according to the relationship $(2K+1)/(2K_{th})$ times the number of teeth ($n_{th}$), where K is a selected integer number and $K_{th}$ is the number of teeth past which each lamination is rotated with respect to adjacent laminations so that spaces between the teeth of adjacent laminations are aligned.

In still a further aspect of the invention, the jacket has ports intermediate axial ends thereof for receiving pressurized cooling fluid, which pressurized cooling fluid flows in opposite axial directions between the jacket and array of pins by passing through the gaps between the pins to cool the stack of laminations and thus the stator of the electrical machine.

In still a further aspect of the invention, the electrical machine is an electric motor.

In still a further aspect of the invention, the electric motor powers an automotive vehicle.

BRIEF DESCRIPTION OF THE DRAWINGS

Various other features and attendant advantages of the present invention will be more fully appreciated as the same becomes better understood where considered in conjunction with the accompanying drawing, in which like reference characters designate the same or similar parts throughout the several views, and wherein.

DETAILED DESCRIPTION

Figure 1:
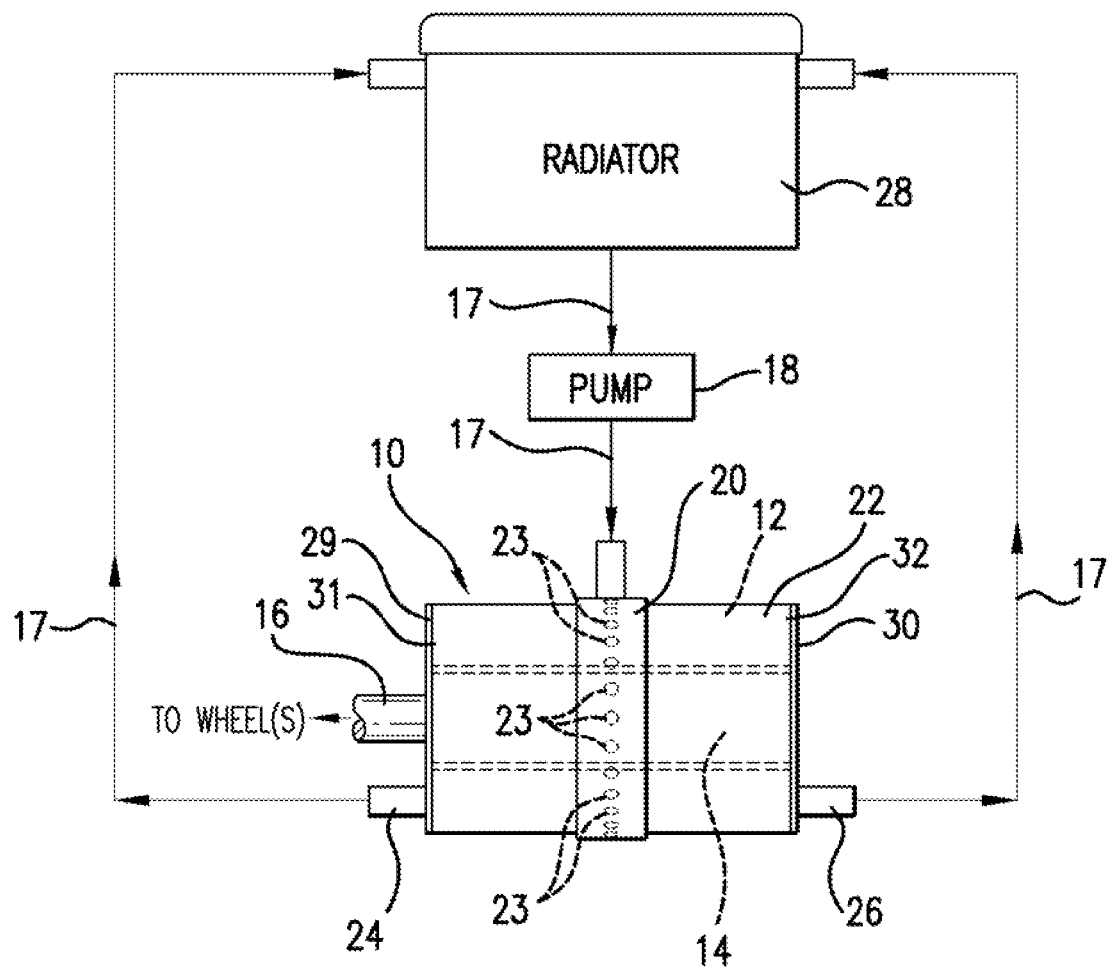
FIG. 1 is a side view of an electric motor, such as an electric motor used to drive an automotive vehicle, in combination with a radiator and pump.

Referring now to FIG. 1 there is shown an electric motor 10 configured in accordance with the principles of the present invention, wherein the electric motor includes a stator 12 and an armature 14. The armature 14 is connected to a shaft 16, which delivered power to a driven element, such as an automotive drive wheel or a transmission connected to a pair of drive wheels. The stator 12 is cooled by a cooling fluid 17, which is preferably a liquid pressured by a pump 18 that pumps the liquid into a manifold 20 disposed around a cooling jacket 22 that surrounds the stator 12. The cooling fluid 17 enters the jacket 22 through an array of holes 23; cools the stator 12; leaves the jacket through outlets 24 and 26, and is returned to a radiator 28 of the vehicle which removes heat from the cooling fluid and thus from the stator. The pump 18 then returns cooled fluid 17 to the manifold 20 so that it may be circulated through the cooling jacket 22 to provide continuous cooling for the stator 12 of the motor 10. While the cooling fluid 17 is preferably a liquid, the fluid may be a phase change material.

Figure 2:
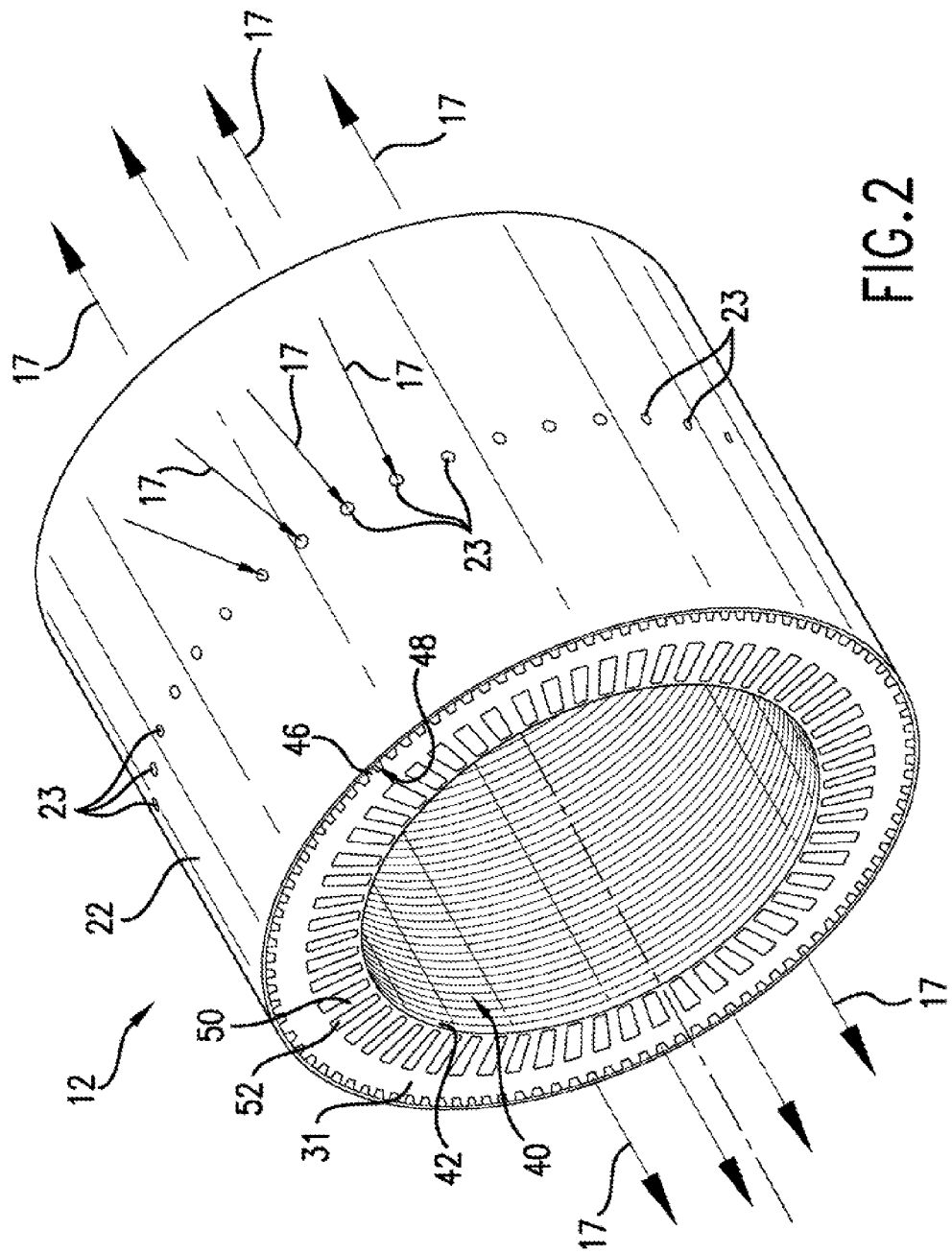
FIG. 2 is a perspective elevational view of a stator of the electric motor of FIG. 1 with a cooling jacket.

Referring now to FIG. 2, the stator 12 of FIG. 1 is shown without the outlets 24 and 26 connected to the fluid collectors 29 and 30 at the ends 31 and 32 of the stator 12. The stator 12 is comprised of a stack 40 of individual laminations 42, which individual laminations are the same in that each lamination is stamped out by the same, or similar stamping tool. This eliminates the need for different stamping tools which are required to prior art arrangements, wherein different laminations are utilized with different part numbers. By fabricating the laminations 42 with the same tool, the cost of the laminations is reduced while case of assembly is increased.

As is seen from the end 31 of the stator 12, each lamination 42 has a pin fin array of outwardly projecting pins 46 on the outside diameter thereof that engages an inner surface 48 of the jacket 22 and defines the outer periphery of the stator. An array of inwardly projecting teeth 50 define the inner periphery of the stator 12 and provide winding spaces 52 that receive windings 56 of the stator (see FIGS. 3 and 6). The teeth 50 of each lamination 12 and thus the spaces 52 are aligned, whereas the pins 46 of adjacent laminations are misaligned. This misalignment of the pins provides flow patterns with mixing eddy currents through cooling spaces 60 between the pins 46 and the inner surface 48 of the jacket 22.

Figure 3:
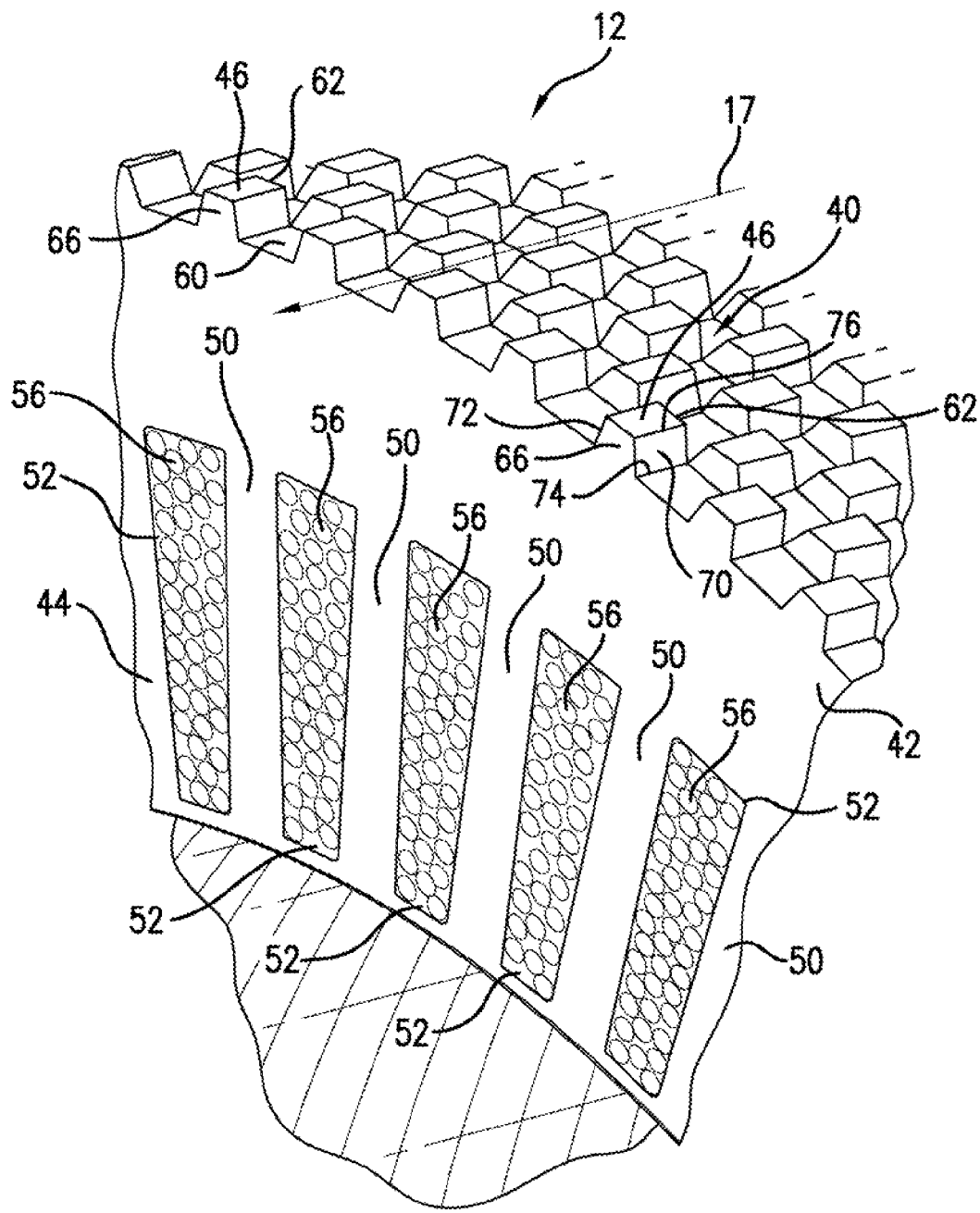
FIG. 3 is an enlarged view of a portion of the stator of FIG. 1 without a cooling jacket.

Referring now to FIG. 3 there is shown an enlarged portion of the stator with the jacket 22 removed. From FIG. 3 it is clear that the identically stamped laminations 42 are in direct abutment with adjacent laminations, each adjacent lamination being rotated so that the inwardly projecting teeth 50 of the laminations align to define the stator winding spaces 52 that extend axially through the stator 12 for receiving the windings 56 of the stator. In order to correctly determine the number of pins 46 on each lamination 42 for a selected number of teeth 50 to properly determine the number of spaces 52, a diophantic equation is used to calculate the number of pins 46 as a function of the number of stator teeth 50 so as to achieve a 180° staggered pin fin array 45. This determination is mathematically achieved as follows:

$n_{th}$—number of stator teeth 50,
$n_{pin}$—number of pins 46 on the stator outside diameter 47,
$k_{th}$—rotation of each lamination group (in number of stator teeth) in order to achieve a pin fin array 45 on the stator outside diameter 47.

Suppose that a lamination group is rotated in respect to the previous one by $k_{th}$ stator teeth 50. The corresponding angle of rotation at the pin fin pitch will be:

$$\alpha_{pin} = k_{th} * (360°/n_{th}) * n_{pin} \quad (1)$$

In order to achieve a staggered pin fin array 45, $\alpha_{pin}$ needs to be an odd multiple of 180°:

$$\alpha_{pin} = (2k+1) * 180°, \quad (2)$$

where k=0, 1, 2, . . . is an arbitrary integer number. In this way, the pins 46 of one group are 180° spaced in respect to the pins of the previous and the following group. Other inter-group angular displacements are possible are dictated by the coolant flow profile requirements.

From eqn. (1) and (2) we get:

$$n_{pin} = \frac{(2k+1) \cdot 180°}{k_{th} \cdot 360°}, \qquad n_{th} = \frac{(2k+1)}{2k_{th}} \cdot n_{th}. \quad (3)$$

Figure 4:
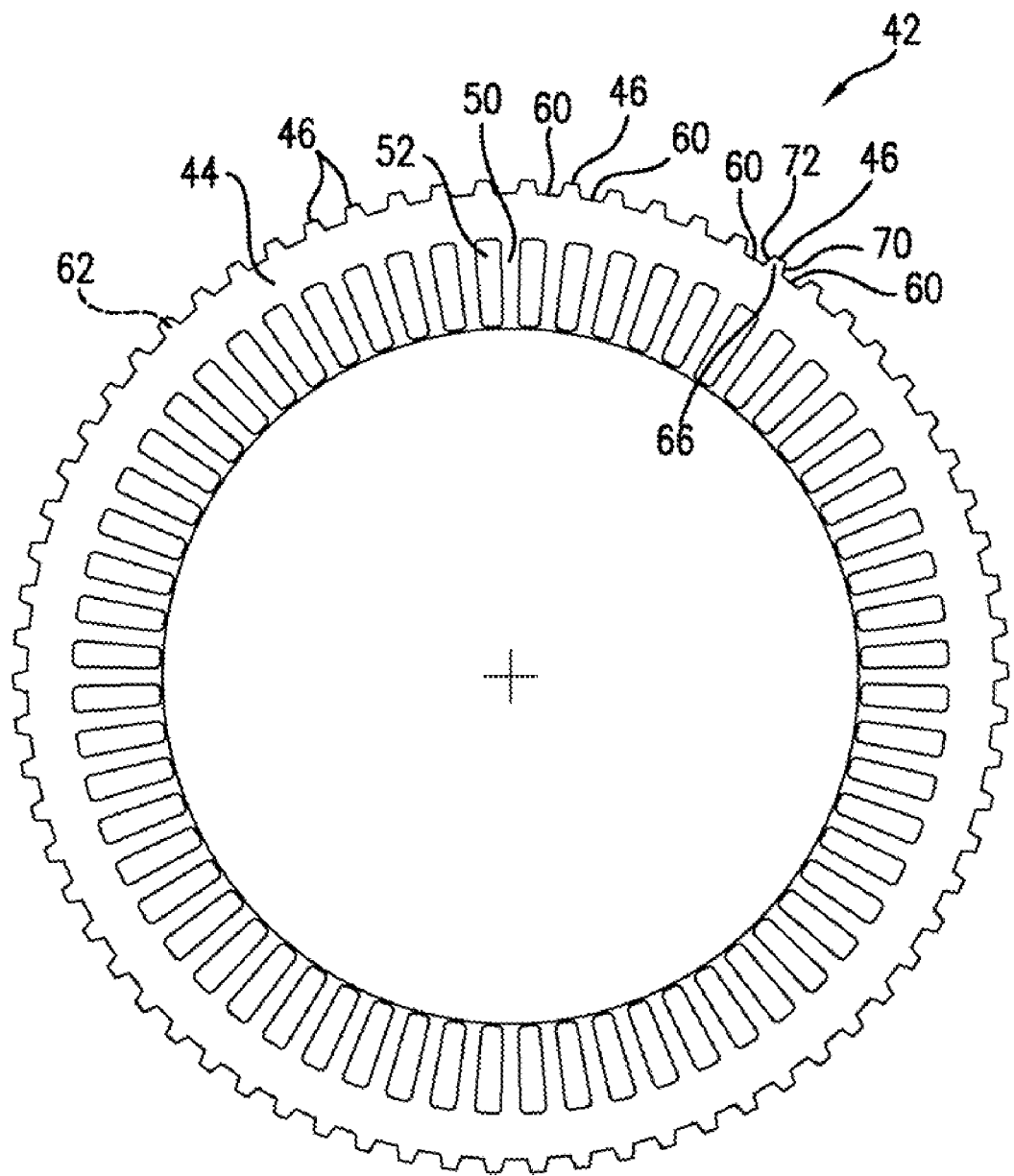
FIG. 4 is an end view of a single lamination used to form the stator of FIGS. 2 and 3.

FIG. 4 shows a single lamination with an example of pin numbers ($n_{pin}$) determined as the function of tooth numbers ($n_{th}$) in accordance with the foregoing equation (3). In FIG. 4 there are sixty teeth 50 and seventy pins 46 for each lamination 42.

Figure 5:
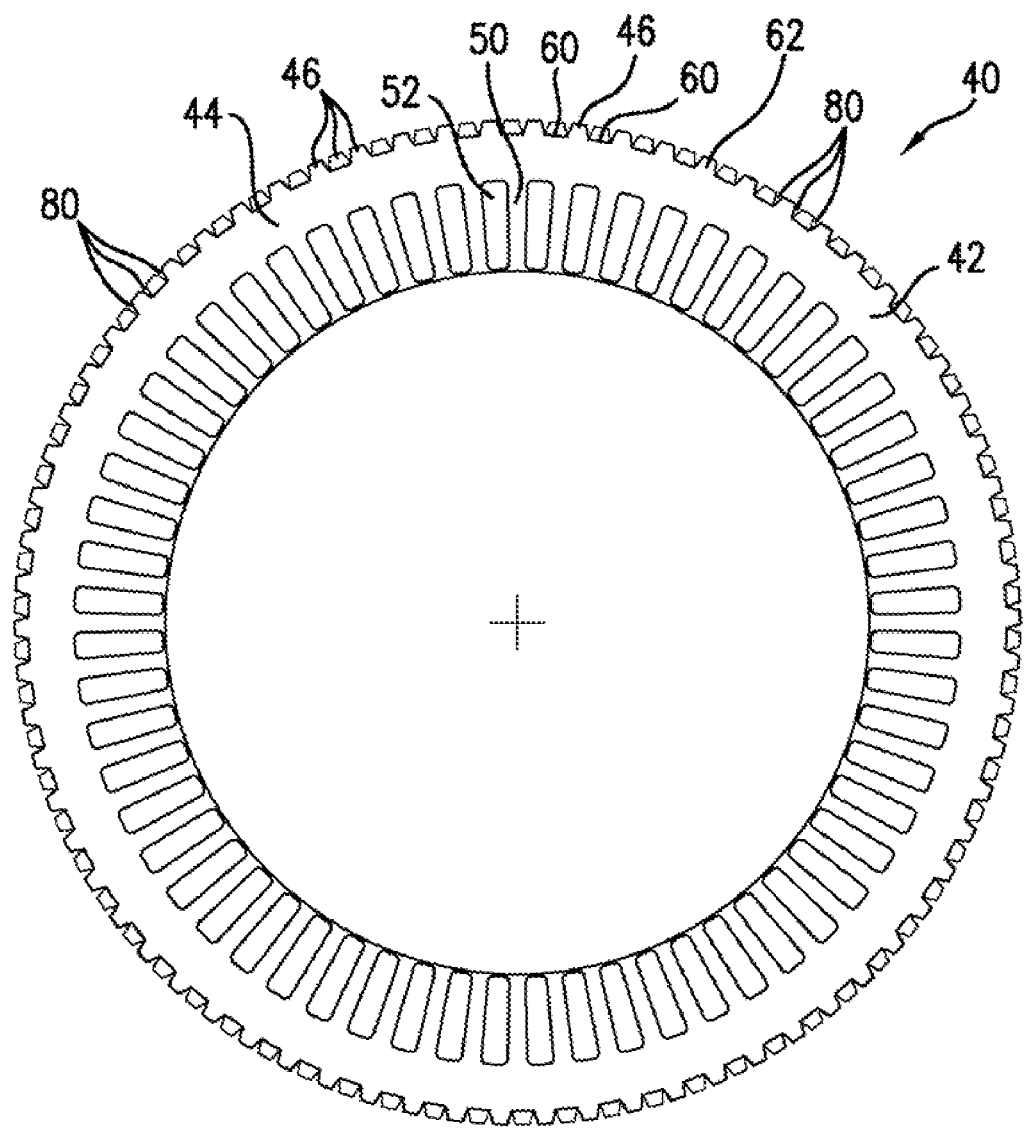
FIG. 5 is an end view of the stack showing two adjacent laminations.

FIG. 5 is an end view of the stack 40 of laminations 42 shown in FIG. 3, wherein as the stack 40 is assembled, each succeeding lamination 42 is rotated by a distance of three teeth 50 that results in an arrangement apparent from FIGS. 3 and 5 in which fluid 17 flowing in gaps 60 between successive pins 46 impacts end faces 62 of the pins on adjacent downstream laminations.

Figure 6:
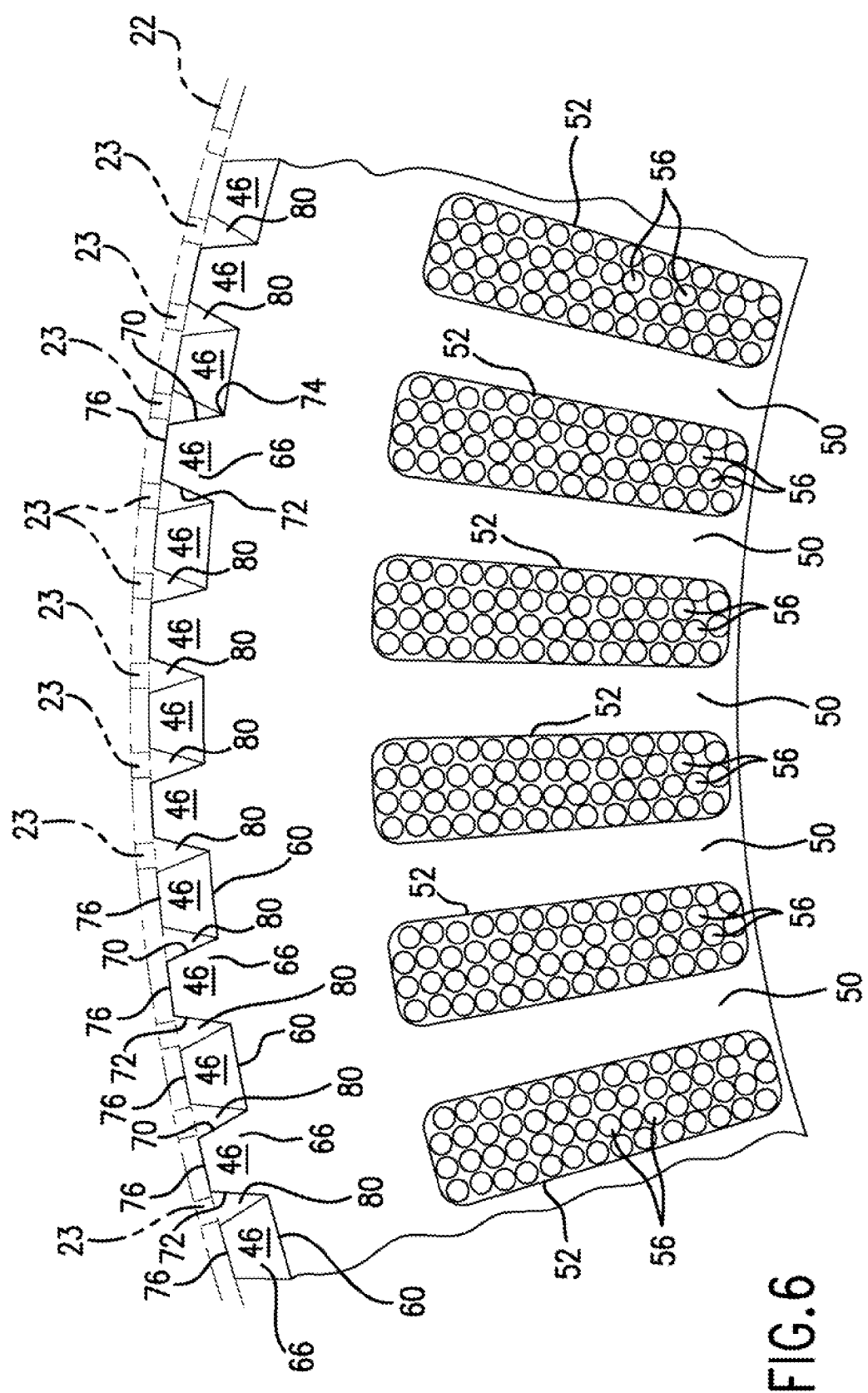
FIG. 6 is an enlarged view of a portion of FIG. 5 showing windings disposed in winding spaces between inwardly projecting teeth of a laminations of FIGS. 2-5.
Figure 7:
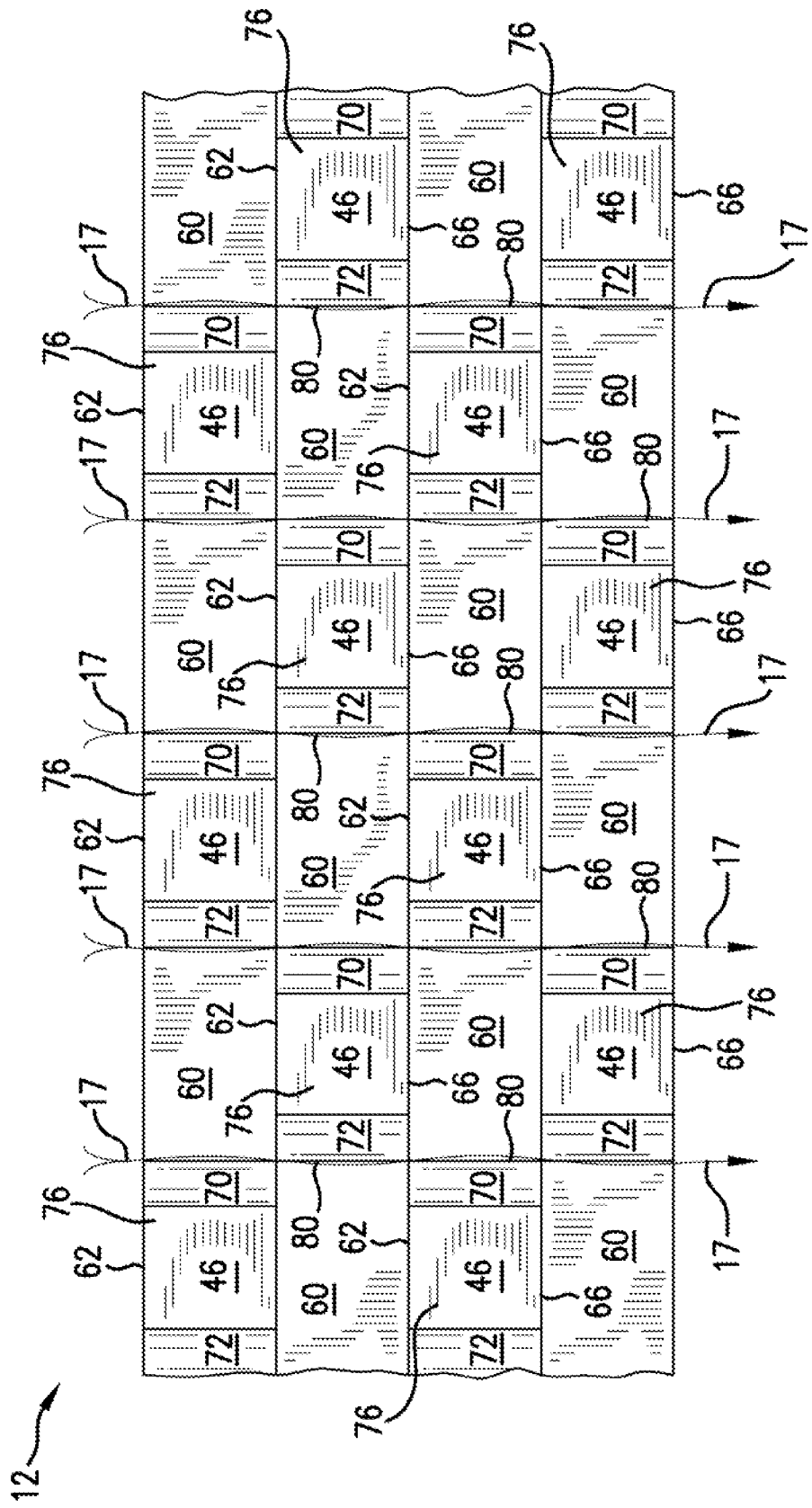
FIG. 7 is an enlarged top view of a portion of FIG. 3 showing flow of cooling fluid over the stator.

As is best seen in FIGS. 6 and 7 showing sections of the stator 12, each of the pins 46 has a flat end face 62 and a flat rear face 66. The flat end faces 62 face the inlet ports 23 (FIGS. 1, 2 and 6) for the cooling fluid 17, while the flat rear faces 66 face the ends 29 and 30 of the stator 12. In order for the teeth 46 not to completely block the gaps 60 between the pins 46, each of the pins have side surfaces 70 and 72 which slope from a base 74 of each pin toward a crown 76. This results in channels 80 between pins 46 on successive laminations 42. These channels 80 form axially extending grooves which send undulating streams of coolant fluid 17 in an axial direction over the surface of the laminations 42 and through the Pin Fin array 45 on the stator 12. The streams of fluid 17 are made turbulent by impacts against the end faces 62 of each pin 46 and upstream eddy currents generated by the rear faces 66 of each pin.

Cooling fluid 17 flowing from the inlet ports 23 is deflected laterally by the end faces 62 of the pins 46 into the gaps 60 and the channels 80 provided by the sloping side surfaces 70 and 72 so that the cooling fluid continues to flow towards the outlets 24 and 26 at the ends of the stator 12. Cooling fluid 17 in the channels 80 also flows behind the rear faces 66 of the pins 46 and forms eddies which help mix the cooling fluid flowing in the channels 80 and the gaps 60.

From the foregoing description, one skilled in the art can easily ascertain the essential characteristics of this invention, and without departing form the spirit and scope thereof, can make various changes and modifications of the invention to adapt it to various usages and conditions.

We claim:

1. A coaxial stack of laminations for a stator of an electrical machine comprising:
    substantially identical laminations with each lamination having an outer periphery and an inner periphery, the laminations directly abutting one another,
    wherein the outer periphery of each lamination is defined by an array of outwardly projecting pins that cooperate with a jacket surrounding the stack to provide a cooling space through which cooling fluid flows, wherein each of the pins has an end face and two side surfaces, and wherein the laminations are rotated, with respect to each other, so that the cooling fluid flowing in gaps between both of the two side surfaces of each of the pins of a first lamination impacts the end faces of pins of a second lamination that is adjacent to the first lamination, and wherein the two side surfaces of each of the pins slope from a base of the pin to a crown of the pin, and wherein the crown of the pin has a width less than a width of the base to provide channels between the pins of adjacent laminations, wherein the channels form axially extending grooves, and wherein the end faces are flat and without holes therethrough, and wherein the laminations are rotated so that an end face of a pin of any of the laminations is adapted to send undulating streams of the cooling fluid in an axial direction over both of the two surfaces of the pin and through the channels when the cooling fluid impacts the end face of the pin, and
    wherein each lamination is further defined by an array of teeth that project inwardly toward the inner periphery, and wherein the teeth provide aligned spaces therebetween for receiving stator windings.

2. The coaxial stack of claim 1, wherein each pin on a lamination is spaced from adjacent pins on the lamination by a distance substantially equal to the width of the base of the pin and wherein the pins of adjacent laminations are aligned with the gaps when the spaces between the teeth are aligned to receive the windings.

3. The coaxial stack of claim 2 wherein the number of pins ($n_{pin}$) is proportional to the number of teeth ($n_{th}$) according to the relationship $(2K+1)/(2K_{+n})$ times the number of teeth $(n_{th})$, where k is equal to a selected integer number and $K_{+n}$ is the number of teeth past which each lamination is rotated with respect to adjacent laminations so that spaces between the teeth of adjacent laminations are aligned.

4. An electrical machine having a coaxial stack of laminations for a stator, the electrical machine comprising:

the coaxial stack of laminations, wherein the stack includes substantially identical laminations with each lamination having an outer periphery and an inner periphery, the laminations directly abutting one another with the outer periphery of each lamination being defined by an array of outwardly projecting pins, wherein each of the pins has an end face and two side surfaces, and each lamination being further defined by an array of teeth that project inwardly toward the inner periphery, and wherein the laminations are rotated, with respect to each other, so that cooling fluid flowing in gaps between both of the two side surfaces of each of the pins of a first lamination impacts the end faces of pins of a second lamination that is adjacent to the first lamination, and wherein the outwardly projecting pins cooperate with a jacket surrounding the stack to provide a cooling space, through which the cooling fluid flows, wherein the two side surfaces of each of the pins slope from a base of the pin to a crown of the pin, and wherein the crown of the pin has a width less than a width of the base to provide channels between the pins of adjacent laminations, wherein the channels form axially extending grooves, and wherein the end faces are flat and without holes therethrough, and wherein the laminations are rotated so that an end face of a pin of any of the laminations is adapted to send undulating streams of the cooling fluid in an axial direction over both of the two surfaces of the pin and through the channels when the cooling fluid impacts the end face of the pin, and wherein the teeth provide aligned spaces therebetween for receiving stator windings; and the jacket, wherein the jacket has ports intermediate axial ends thereof for receiving pressurized cooling fluid, which pressurized cooling fluid flows in opposite axial directions through the channels between the pins to cool the stack of laminations and thus the stator of the electrical machine.

5. The electrical machine of claim 4 wherein the electrical machine incorporating the stator comprises the stator of an electric motor.

6. An apparatus including a coaxial stack of laminations for a stator of an electric motor used to power an automotive vehicle having a heat exchanger, comprising:

the coaxial stack of laminations, wherein the coaxial stack includes substantially identical laminations with each lamination having an outer periphery and an inner periphery, the laminations directly abutting one another, wherein the outer periphery of each lamination is defined by an array of outwardly projecting pins that cooperate with a jacket surrounding the stack to provide a cooling space through which cooling fluid flows, wherein each of the pins has an end face and two side surfaces, and wherein the laminations are rotated, with respect to each other, so that the cooling fluid flowing in gaps between both of the two side surfaces of each of the pins of a first lamination impacts the end faces of pins of a second lamination that is adjacent to the first lamination, and wherein the two side surfaces of each of the pins slope from a base of the pin to a crown of the pin, and wherein the crown of the pin has a width less than a width of the base to provide channels between the pins of adjacent laminations, wherein the channels form axially extending grooves, and wherein the end faces are flat and without holes therethrough, and wherein the laminations are rotated so that an end face of a pin of any of the laminations is adapted to send undulating streams of the cooling fluid in an axial direction over both of the two surfaces of the pin and through the channels when the cooling fluid impacts the end face of the pin, and wherein each lamination is further defined by an array of teeth that project inwardly toward the inner periphery, and wherein the teeth provide aligned spaces therebetween for receiving stator windings; and fluid connections between the heat exchanger of the vehicle for cooling fluid flowing from the cooling space around the stack of laminations and returning cooled fluid to the cooling space.

7. The apparatus of claim 6, wherein each pin on a lamination is spaced from adjacent pins on the lamination by a distance equal to the width of the base of the pin, and wherein the pins of adjacent laminations are aligned with the gaps when the spaces between the teeth are aligned to receive the windings.

8. The apparatus of claim 7 wherein the number of pins ("pin) is proportional to the number of teeth($n_{th}$) according to the relationship $(2K+1)(2K_{+n})$ times the number of teeth $(n_{th})$, where k is equal to a selected integer number and $k_{+n}$ is the number of teeth past which each lamination is rotated with respect to adjacent laminations so that spaces between the teeth of adjacent laminations are aligned.

9. An apparatus including a coaxial stack of laminations for a stator of an electric motor used to power an automotive vehicle having a heat exchanger, comprising:

the coaxial stack of laminations, wherein the stack includes substantially identical laminations with each lamination having an outer periphery and an inner periphery, the laminations directly abutting one another with the outer periphery of each lamination being defined by an array of outwardly projecting pins, wherein each of the pins has an end face and two side surfaces, and each lamination being further defined by an array of teeth that project inwardly toward the inner periphery, and wherein the laminations are rotated, with respect to each other, so that cooling fluid flowing in gaps between both of the two side surfaces of each of the pins of a first lamination impacts the end faces of pins of a second lamination that is adjacent to the first lamination, and wherein the outwardly projecting pins cooperate with a jacket surrounding the stack to provide a cooling space, through which the cooling fluid flows, wherein the two side surfaces of each of the pins slope from a base of the pin to a crown of the pin, and wherein the crown of the pin has a width less than a width of the base to provide channels between the pins of adjacent laminations, wherein the channels form axially extending grooves, and wherein the end faces are flat and without holes therethrough, and wherein the laminations are rotated so that an end face of a pin of any of the laminations is adapted to send undulating streams of the cooling fluid in an axial direction over both of the two surfaces of the pin and through the channels when the cooling fluid impacts the end face of the pin, and wherein the teeth provide aligned spaces therebetween for receiving stator windings, the jacket, wherein the jacket has ports intermediate axial ends thereof for receiving pressurized cooling fluid, which pressurized cooling fluid flows in opposite axial directions through the channels between the pins to cool the stack of laminations and thus the stator of the electric motor; and fluid connections between the heat exchanger of the vehicle for cooling the cooling fluid flowing from the cooling space around the stack of laminations and returning the cooling fluid to the cooling space.

10. An apparatus comprising:

an electric motor having
- a stator formed from a coaxial stack of substantially identical laminations and having a first end and a second end, wherein each lamination has an outer periphery and an inner periphery, the laminations directly abutting one another,
  - wherein the outer periphery of each lamination is defined by an array of outwardly projecting pins that cooperate with a jacket surrounding the stack to provide a cooling space through which cooling fluid flows, wherein each of the pins has an end face and two side surfaces, and wherein the laminations are rotated, with respect to each other, so that the cooling fluid flowing in gaps between both of the two side surfaces of each of the pins of a first lamination impacts the end faces of pins of a second lamination that is adjacent to the first lamination, and wherein the two side surfaces of each of the pins slope from a base of the pin to a crown of the pin, and wherein the crown of the pin has a width less than a width of the base to provide channels between the pins of adjacent laminations, wherein the channels form axially extending grooves, and wherein the end faces are flat and without holes therethrough, and wherein the laminations are rotated so that an end face of a pin of any of the laminations is adapted to send undulating streams of the cooling fluid in an axial direction over both of the two surfaces of the pin and through the channels when the cooling fluid impacts the end face of the pin, and
  - wherein each lamination is further defined by an array of teeth that project inwardly toward the inner periphery, and wherein the teeth provide aligned spaces therebetween for receiving stator windings,
- a jacket surrounding the stator and in cooperation with the array of outwardly projecting pins to provide a cooling space through which the cooling fluid flows, wherein the jacket includes holes through which the cooling fluid may enter the jacket, and
- one or more outlets at one or more of the first end and the second end through which the cooling fluid may leave the jacket.

11. The apparatus of claim 10, wherein the one or more outlets of the electric motor comprise:
a first outlet at the first end; and
a second outlet at the second end.

12. The apparatus of claim 10, wherein the holes of the jacket comprise:
an array of holes positioned on the jacket between the first end and the second end.

13. The apparatus of claim 10, wherein the electric motor further comprises:
a manifold disposed around the jacket to receive the cooling fluid from a pump.

14. The apparatus of claim 13, further comprising:
the pump in fluid communication with the manifold, and adapted to provide the cooling fluid to the manifold.

15. The apparatus of claim 13, further comprising:
a radiator in fluid communication with the manifold, and adapted to receive the cooling fluid from the manifold.

16. The apparatus of claim 10, wherein the apparatus comprises an automotive vehicle.

* * * * *